US011064511B2

(12) United States Patent
Sadeh et al.

(10) Patent No.: US 11,064,511 B2
(45) Date of Patent: *Jul. 13, 2021

(54) DEJITTERING SYSTEM

(71) Applicant: VASONA NETWORKS INC., Austin, TX (US)

(72) Inventors: Oren Sadeh, Tel-Aviv (IL); Nery Strasman, Ramat Gan (IL); Vijay Devarapalli, Los Altos, CA (US)

(73) Assignee: VASONA NETWORKS INC., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/443,615

(22) Filed: Jun. 17, 2019

(65) Prior Publication Data

US 2019/0306870 A1     Oct. 3, 2019

Related U.S. Application Data

(63) Continuation of application No. 15/227,076, filed on Aug. 3, 2016, now Pat. No. 10,349,430.

(51) Int. Cl.
*H04W 72/12* (2009.01)
*H04W 28/02* (2009.01)
*H04W 40/12* (2009.01)
*H04W 56/00* (2009.01)
*H04L 12/26* (2006.01)
(Continued)

(52) U.S. Cl.
CPC ..... *H04W 72/1231* (2013.01); *H04L 43/0852* (2013.01); *H04L 47/2416* (2013.01); *H04L 47/2441* (2013.01); *H04L 47/283* (2013.01); *H04L 47/32* (2013.01); *H04W 28/0236* (2013.01); *H04W 40/12* (2013.01); *H04W 56/0045* (2013.01); *H04L 43/062* (2013.01);
(Continued)

(58) Field of Classification Search
None
See application file for complete search history.

(56) References Cited

U.S. PATENT DOCUMENTS

2015/0131538 A1*  5/2015  Ben-Nun ............ H04L 47/2416
                                                    370/329
2016/0057649 A1*  2/2016  Kakadia ................ H04L 47/283
                                                    370/235

OTHER PUBLICATIONS

Notice of Allowance dated Feb. 28, 2019, filed in U.S. Appl. No. 15/277,076, pp. 1-7.
(Continued)

*Primary Examiner* — Peter Chen
*Assistant Examiner* — Jeff Banthrongsack

(57) ABSTRACT

Described embodiments include a system that includes a network interface and a processor. The network interface is configured to receive, at a first time, a packet transmitted from a source communication terminal over a communication network en route to a target communication terminal, before the packet passes through a particular portion of the communication network, and to receive the packet at a second time, after the packet has passed through the particular portion of the communication network. The processor is configured to delay the packet, subsequently to the packet being received at the second time, by a delay duration that is a decreasing function of a duration between the first time and the second time, and to send the delayed packet, subsequently, via the network interface, en route to the target communication terminal. Other embodiments are also described.

20 Claims, 2 Drawing Sheets

(51) Int. Cl.
*H04L 12/853* (2013.01)
*H04L 12/851* (2013.01)
*H04L 12/841* (2013.01)
*H04L 12/823* (2013.01)

(52) U.S. Cl.
CPC ........ *H04L 43/087* (2013.01); *H04L 43/0864* (2013.01)

(56) References Cited

OTHER PUBLICATIONS

Request for Continued Examination dated Aug. 6, 2018, filed in U.S. Appl. No. 15/277,076, pp. 8-21.
Applicant Initiated Interview Summary dated Jul. 30, 2018, filed in U.S. Appl. No. 15/277,076, pp. 22-24.
Applicant Initiated Interview Summary dated Jan. 23, 2018, filed in U.S. Appl. No. 15/277,076, pp. 25-27.
Amendment/Request for Reconsideration—After Non-Final Rejection dated Jan. 22, 2018, filed in U.S. Appl. No. 15/277,076, pp. 28-38.
Non-Final Rejection dated Nov. 20, 2017, filed in U.S. Appl. No. 15/277,076, pp. 39-50.

* cited by examiner

DEJITTERING SYSTEM

FIELD OF THE INVENTION

Embodiments of the present invention relate to cellular communication networks, such as Voice over Long Term Evolution (VoLTE) networks, in which voice and data are carried in packets.

BACKGROUND

In IP-based cellular communication networks, such as VoLTE networks, "jitter" refers to a variation in the latency of packets in a packet flow between the source (or "sending") terminal and the target (or "receiving") terminal. (Jitter may alternatively be referred to as "packet delay variation.") Jitter may adversely affect the playback of voice or media by the target terminal.

U.S. Pat. No. 9,345,041, whose disclosure is incorporated herein by reference, discloses methods, systems, and computer program products relating to supervising data in a wireless network. At least part of a system may be located between a packet data network and a base station, and/or may be at least logically separate from the base station. The system may be capable of evaluating the service provided by the base station, and may be capable of determining whether or not any action should consequently be performed. Examples of an action may include an action which may not necessarily affect en route data packets such as outputting a report, and/or an action which may affect en route data packets such as delaying packets, not delaying packets, and/or stopping the delaying of packets. An action which affects data packets may or may not affect data packets uniformly. An action may or may not result in an improvement in quality of user experience.

SUMMARY OF THE INVENTION

There is provided, in accordance with some embodiments of the present invention, a system that includes a network interface and a processor. The network interface is configured to receive, at a first time, a packet transmitted from a source communication terminal over a communication network en route to a target communication terminal, before the packet passes through a particular portion of the communication network, and to receive the packet at a second time, after the packet has passed through the particular portion of the communication network. The processor is configured to delay the packet, subsequently to the packet being received at the second time, by a delay duration that is a decreasing function of a duration between the first time and the second time, and to send the delayed packet, subsequently, via the network interface, en route to the target communication terminal.

In some embodiments, the communication network is a cellular communication network.

In some embodiments, the packet belongs to a flow, and the delay duration depends on a difference between a target latency for the flow and the duration between the first time and the second time.

In some embodiments, the processor is further configured to set the target latency.

In some embodiments, the processor is configured to set the target latency by requiring that a particular percentage of observed latencies be less than the target latency.

In some embodiments, the processor is configured to set the target latency responsively to an estimated size of a jitter buffer of the target communication terminal.

In some embodiments, the target latency is a first target latency, and the processor is further configured to set a second target latency, for another flow, that is different from the first target latency.

In some embodiments, the processor is configured to set the target latency in response to a similarity between the flow and another flow.

In some embodiments, the processor is further configured to estimate a total duration required for the packet (i) to reach the system from the source communication terminal, and (ii) to reach the target communication terminal from the system, and the delay duration is a decreasing function of the estimated total duration.

In some embodiments, the processor is configured to delay the packet responsively to a message from the target communication terminal that reports a packet delay variation.

There is further provided, in accordance with some embodiments of the present invention, a method. The method includes receiving, by a dejittering system, at a first time, a packet transmitted from a source communication terminal over a communication network en route to a target communication terminal, before the packet passes through a particular portion of the communication network. The method further includes receiving, by the dejittering system, at a second time, the packet, after the packet has passed through the particular portion of the communication network. The method further includes, subsequently, delaying the packet by a delay duration that is a decreasing function of a duration between the first time and the second time, and subsequently, sending the delayed packet from the dejittering system en route to the target communication terminal.

The present invention will be more fully understood from the following detailed description of embodiments thereof, taken together with the drawings, in which:

DETAILED DESCRIPTION OF EMBODIMENTS

Overview

Figure 1:
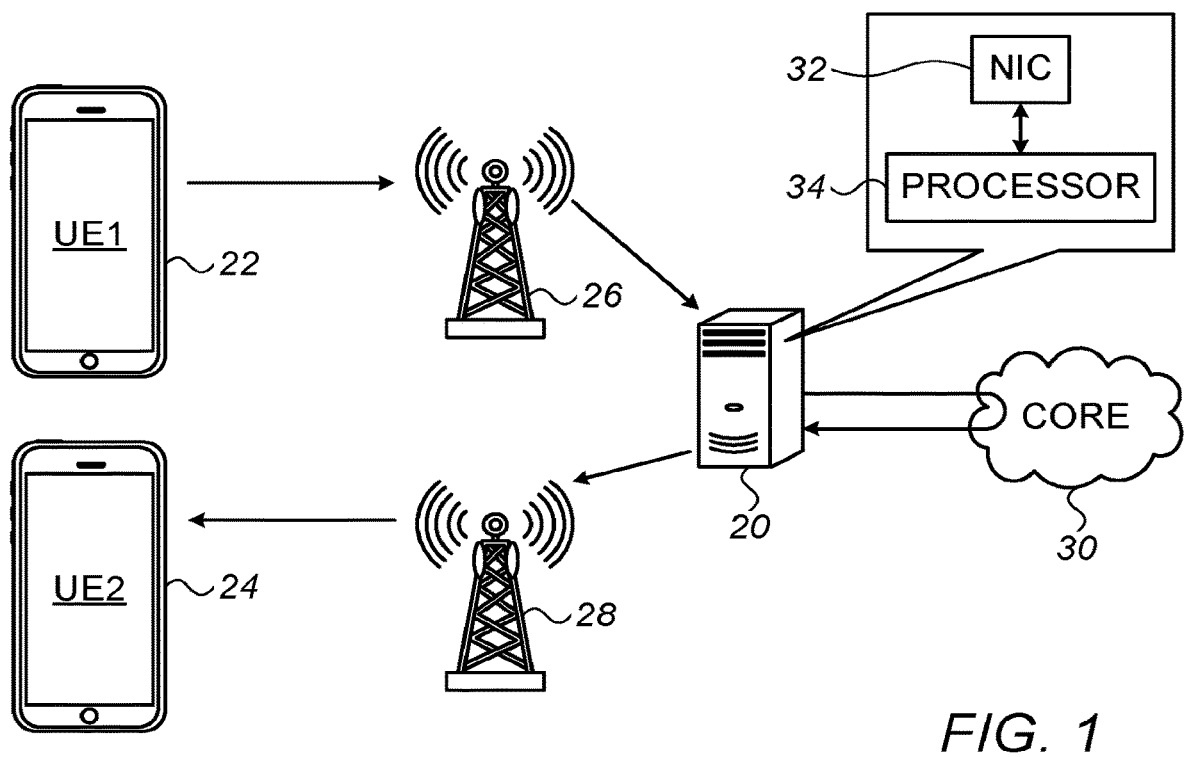
FIG. 1 is a schematic illustration of a dejittering system placed within a cellular communication network, in accordance with some embodiments of the present invention.

Cellular communication terminals are typically configured to reduce the effect of jitter by maintaining a jitter buffer (which may be referred to simply as a "buffer"), in which received packets are stored prior to playback. The maintenance of the buffer reduces the likelihood that a relatively large latency will adversely affect the playback of the received packets.

Despite the buffer, however, jitter may adversely affect playback, in that jitter causes the target terminal difficulty in locking onto the clock of the source terminal. More specifically, the respective internal clocks of the source and the target may run at slightly different speeds, the difference between the speeds varying over time. Due to this time-varying difference in speeds, it is important that the target lock onto the clock of the source, such that the target can play back the voice or media at the proper rate. (Otherwise, for example, each 100-bit voice stream encoded by the source at 100 bits/second may be played back by the target in only 980 milliseconds.) To lock onto the clock (e.g., using a phase-locked loop (PLL)), the target typically uses at least two inputs: the time stamps encoded in (at least some of) the packets, and the durations between the receipt of successive packets. In general, the closer these durations are to the durations between the transmission of these packets, the more successful the locking will be. Jitter thus inhibits the locking from being successfully performed, by causing the receipt durations to differ from the transmission durations.

For example, supposing a first packet is transmitted at 0 ms, a second packet at 100 ms, and a third packet at 150 ms, the transmission durations would be 100 (100-0) ms and 50 (150-100) ms, respectively. With a constant latency of 50 ms, these packets would be received at 50 ms, 150 ms, and 200 ms, such that the receipt durations would also be 100 (150-50) ms and 50 (200-150) ms, respectively. On the other hand, supposing a latency of 40 ms for the first packet, 50 ms for the second packet, and 40 ms for the third packet, the receipt durations would be 110 ms and 40 ms, respectively. The receipt durations would thus differ from the transmission durations.

Embodiments of the present invention address this problem, and/or other problems that may be caused by jitter, by reducing jitter in cellular communication networks. In embodiments of the present invention, a dejittering system, comprising a processor, is placed between the base stations of a cellular communication network and the core network of the cellular communication network. Each packet passed between the base stations and the core network passes through the system twice: once en route to the core network, and again en route from the core network. The processor records (e.g., in a table) the time at which packet was first received by the system. Then, upon the packet being received for the second time, the processor calculates the amount of time that elapsed from the first recorded time. If this amount of time is below a particular target latency, the processor delays the packet, such as to achieve the target latency. Hence, assuming a proper choice of the target latency (i.e., assuming a target latency that is not too low), variation in latency is reduced, since, for most packets, the latency of the packet will approximately equal the target latency.

System Description

Reference is initially made to FIG. 1, which is a schematic illustration of a dejittering system 20 placed within a cellular communication network, such as a Voice over Long-Term Evolution (VoLTE) network, in accordance with some embodiments of the present invention. System 20 comprises a network interface, comprising, for example, a network interface controller (NIC) 32, and a processor 34 in communication with the network interface. As further described below, packets exchanged over the network are received by NIC 32, and, in accordance with instructions from processor 34, are then passed on by NIC 32. The NIC and processor may be disposed, for example, on a common server.

FIG. 1 depicts a source cellular communication terminal 22, referred to herein as "User Equipment 1" ("UE1"), sending a packet (containing, for example, voice information), over the network, to a target cellular communication terminal 24, referred to herein as "User Equipment 2" ("UE2"). First, the packet is transmitted from UE1 to a first base station 26, which, for the particular flow shown in FIG. 1, plays the role of a "source base station." Next, the packet is sent to system 20. From system 20, the packet is routed through a core network 30 of the cellular communication network, and back to system 20. The packet is then sent to a second base station 28, which, for the particular flow shown in FIG. 1, plays the role of a "target base station." From second base station 28, the packet is transmitted to UE2.

Without system 20, packets would pass, from the source base station, directly to the core network, through the core network, and from the core network, directly to the target base station. Due, primarily, to the varying amount of time required for a packet to pass through the core network, the packet latency (or "packet delay"), which is the total time required for a packet to travel from the source terminal to the target terminal, would vary by a relatively large amount. In other words, the cellular communication network would cause the flow of packets between UE1 and UE2 to exhibit a relatively large amount of jitter.

Hence, per embodiments of the present invention, system 20 is inserted, e.g., by the operator of the network, between the base stations of the network and core network 30, such that each packet exchanged between cellular communication terminals passes through system 20 twice: once en route to the core network from the source base station, and again en route from the core network to the target base station. Due to the location of the system, the system is able to precisely ascertain the time that was required for the packet to pass through the core network. If this time is less than a particular target latency, the system delays the packet, such as to achieve the target latency. The system then sends the packet en route (via the target base station) to the target cellular communication terminal. The system thus reduces jitter, by delaying packets whose latency is less than the target latency.

As described above, the reduction in jitter that is effected by system 20 helps, for example, by causing most or all of the durations between the receipt of the packets to match, or at least be very close to, the corresponding durations between transmission of the packets. Thus, UE2 is better able to lock onto the clock of UE1. For example, as described above, UE2 may run a PLL that attempts to lock onto the clock of UE1. Reduced jitter enables the PLL to perform better, e.g., by rendering the PLL more accurate, enabling the PLL to achieve lock faster, and/or enabling the PLL to lose lock more rarely.

It is noted that, for clarity, FIG. 1 is highly simplified, showing only a single flow of traffic between two cellular terminals. (In general, in the context of the present application, the term "flow" refers to a unidirectional flow, e.g., from UE1 to UE2.) In practice, system 20 simultaneously handles a plurality of flows between many cellular terminals. Typically, as further described below with reference to FIG. 3, the target latency is set separately for each flow. Thus, for example, the flow from UE2 to UE1 may have a different target latency from that of the flow from UE1 to UE2. Alternatively, the system may apply a single target latency to a particular group of flows, in response to the flows being similar to each other. (Flows that share similar properties tend to follow the same, or a very similar, path through the core network, and thus tend to exhibit a similar amount of jitter.) Thus, for example, all audio flows may have one particular target latency, and all video flows may have another particular target latency. Alternatively, the system may separately group different types of audio flows, and different types of video flows. For example, flows that are transcoded within the core network may have one target latency, and flows that are not transcoded may have another target latency.

Typically, for each flow, processor 34 stores the packets received from the core network in a digital memory (not shown) belonging to the system, e.g., on a common server with the processor. The packets are then released, successively, in the proper order, from the memory, at the release times that are dictated by the target latency. If the memory is full when a new packet is received, the processor typically immediately releases the next packet from the memory, even if the target latency has not yet been reached, in order to make room for the newly-received packet and thus ensure that no packets are dropped.

Although the present description, and FIG. 1, relate mainly to a cellular communication network serving a plurality of cellular communication terminals, it is noted that embodiments described herein may be applied to any suitable type of wireless or wired communication network, serving any suitable type(s) of communication terminals. For example, embodiments described herein may be applied to dejittering a WiFi network serving a plurality of WiFi-enabled devices, such as mobile or desktop computers, mobile phones, and/or other devices, or to dejittering a wired Voice over Internet Protocol (VoIP) network serving a plurality of VoIP phones and/or other devices. Like cellular communication networks, such communication networks, as well as many other types of communication networks not explicitly mentioned here, include core networks (or "network cores"), and/or other portions, that delay packets by varying amounts of time. System 20 may thus dejitter any one of these networks, by receiving packets before and after the packets pass through the particular jitter-causing portion of the network, and delaying the packets as appropriate, as described herein.

Processor 34 may be embodied as a single processor, or as a cooperatively networked or clustered set of processors. As an example of the latter, system 20 may comprise two servers, comprising respective processors that are cooperatively networked with one another. One of these processors may receive packets from the source base station, and pass the packets through the core network, and the other of these processors may receive the packets from the core network and send the packets to the target base station. Processor 34 is typically a programmed digital computing device comprising a central processing unit (CPU), random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded to the computer in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

In some embodiments, system 20 is at least partly situated within the core network. In such embodiments, the system may first receive each packet after the packet has entered the core network, but before the packet has passed through at least part (typically, most) of the core network that lies ahead along the packet's route. Alternatively or additionally, the system may receive the packet, for the second time, before the packet has left the core network, but after the packet has passed through part (typically, most) of the core network that lay along the packet's route.

Figure 2A:
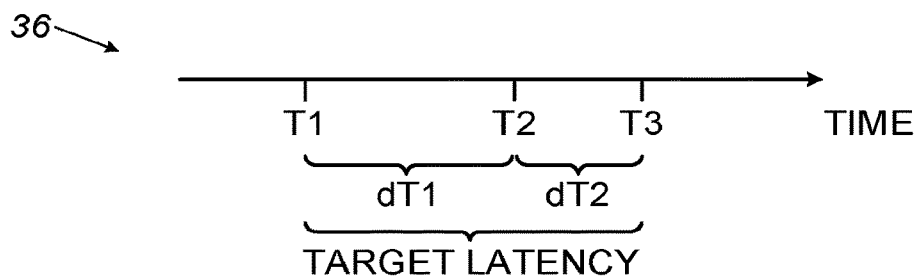
FIGS. 2A-B are schematic illustrations of dejittering timelines, in accordance with some embodiments of the present invention.
Figure 2B:
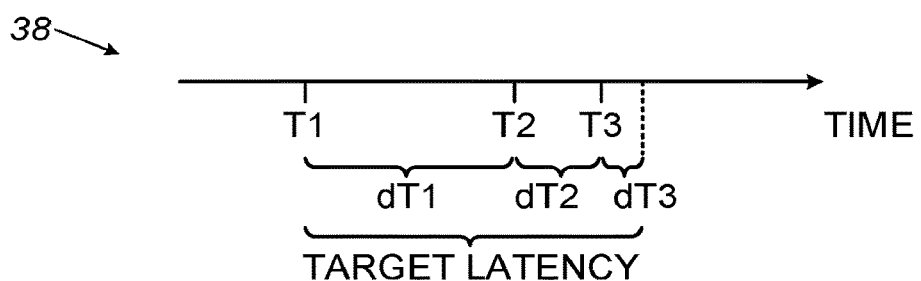

Reference is now additionally made to FIGS. 2A-B, which are schematic illustrations of dejittering timelines, in accordance with some embodiments of the present invention.

Dejittering timeline 36, in FIG. 2A, corresponds to one way in which system 20 may dejitter the network. In this embodiment, processor 34 first records the time of arrival "T1" of each packet, at NIC 32, from the source base station. Subsequently, after the packet has passed through the core network, the processor again records the time of arrival "T2" of the packet. The processor then computes the duration "dT1" between T1 and T2, and compares dT1 to the target latency. If dT1 is less than the target latency, the processor delays the packet by a delay duration "dT2," such that the total latency, dT1+dT2, is equal to the target latency. Following the delay duration dT2, at time "T3" (referred to above as the "release time"), the processor sends the packet to the target base station.

The delay duration, dT2, is thus a decreasing function of the duration dT1. In the specific example illustrated in FIG. 2A, the delay duration is the difference between the target latency and dT1, i.e., dT2=TARGET−dT1. Alternatively (e.g., as described immediately below with reference to FIG. 2B), the delay duration may be some other function that depends on the difference between the target latency and dT1.

In some cases, a packet is modified on its way through the core network; for example, data in the packet may be transcoded to a different format, the packet may be converted to a different communication protocol, or any other suitable operation on the packet may be performed. It follows that a given packet received by the system en route from the core network may be a modified version of a packet previously received en route to the core network. (Equivalently, it may be said that the given packet is derived from the previously-received packet.) The given packet, however, will typically share an identifier, such as a sequence number, with the original packet. (In other words, the core network will typically not modify the identifier.) The processor may therefore use this identifier to associate each packet received from the core network with the appropriate T1 value. For example, in recording T1 for each packet, the processor may associate T1, in the digital memory of the system, with the identifier. For each packet received from the core network, the processor may locate the identifier of the received packet in the memory, and then retrieve the associated T1 value.

(It is noted that references within the present application, including the claims, to receiving "the packet" en route from the core network are to be understood in light of the above. That is, the use of the word "the" does not necessarily imply that the packet received en route from the core network is exactly the same as a packet previously received en route to the core network; rather, the packet may have been modified while passing through the core network, as noted above.)

The embodiment of FIG. 2A effectively ignores the latency "downstream" from system 20. In other words, the embodiment of FIG. 2A assumes that the amount of time required for a packet to arrive at the system from the source terminal, and the amount of time required for the packet to arrive at the target terminal from the system, are insignificant, relative to the time required for the packet to pass through the core network.

In other embodiments, on the other hand, as illustrated by dejittering timeline 38 in FIG. 2B, the processor estimates the total duration "dT3" required for the packet (i) to reach the dejittering system from the source cellular communication terminal, and (ii) to reach the target cellular communication terminal from the dejittering system. The delay duration dT2 is then a decreasing function of dT3, in addition to being a decreasing function of dT1. For example, the processor may set dT2 such that dT2=TARGET−dT1−dT3. By accounting for dT3, the processor may provide a better achievement of the target latency, relative to the embodiment of FIG. 2A. (In FIG. 2B, the target latency and dT1 are intentionally drawn to be the same respective lengths as in FIG. 2A, in order to illustrate this point.)

In some embodiments, the system estimates a "round trip time," by sending a packet to a UE, receiving the corresponding acknowledgement packet from the UE, and calculating the duration between the sending of the packet and the receipt of the acknowledgement packet. (Such an estimation is described, for example, in the aforementioned U.S. Pat. No. 9,345,041, whose disclosure is incorporated herein by reference.) This round trip time—which is different from, but analogous to, dT3—may then be used as a basis for estimating dT3. For example, the round trip time may be used as a proxy for dT3, in that dT3 may be estimated as being equal to the round trip time. Alternatively, dT3 may be estimated by applying an appropriate function to the estimated round trip time. (Such a technique is implementable only in situations in which the network is based on a protocol, such as the Transmission Control Protocol (TCP), in which acknowledgement packets are sent. Although VoLTE networks are typically based on the User Datagram Protocol (UDP), in which acknowledgement packets are not sent, some VoLTE networks are based on TCP.)

Figure 3:
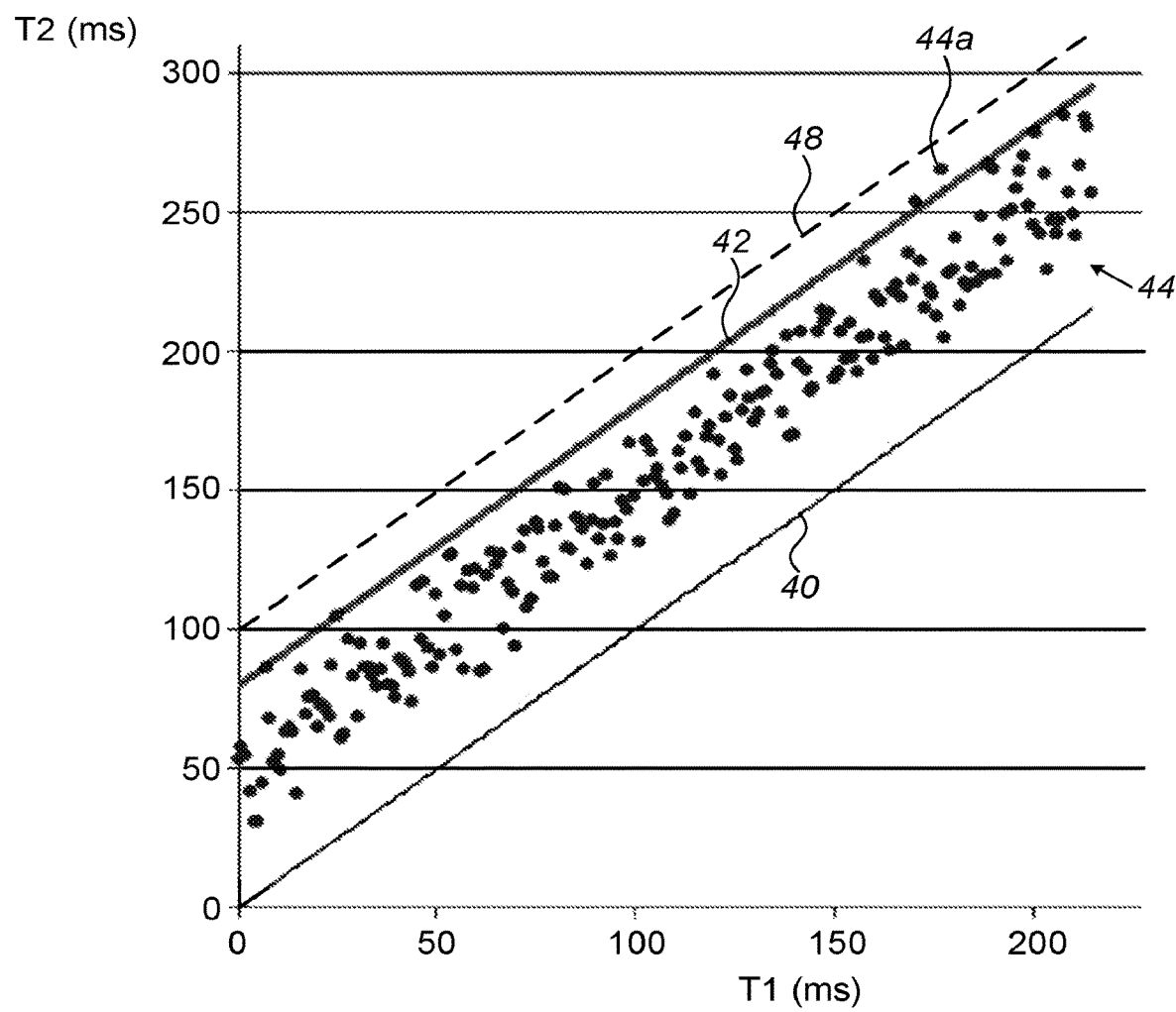
FIG. 3 is a schematic illustration of a technique for setting a target latency, in accordance with some embodiments of the present invention.

Reference is now made to FIG. 3, which is a schematic illustration of a technique for setting a target latency, in accordance with some embodiments of the present invention.

Typically, system 20 is configured to passively monitor each particular flow of communication from a source terminal to a target terminal, prior to performing any dejittering for the flow. In passively monitoring the flow, the system typically records both T1, the first time at which each packet arrived at the system, and T2, the second time at which the packet arrived at the system. The processor then sets the target latency based on the recorded times T1 and T2, as further described below.

In FIG. 3, each pair of T1 and T2 is represented by a two-dimensional data point 44. When the data points are plotted as in FIG. 3, the "scatter" of the data points gives a visual indication as to the jitter of the flow. In this context, the scatter of the data points refers to the deviation of the data points from a straight line having the equation T2=T1+L, L being any constant latency. For example, in FIG. 3, the data points are approximately uniformly scattered between the hypothetical lines T2=T1+20 ms and T2=T1+85 ms. (In FIG. 3, a line 40, having the equation T2=T1, corresponds to the theoretical "lower bound" on the latency of a packet; no packet may arrive at the target terminal before the packet is sent from the source terminal.)

Typically, the processor sets the target latency by requiring that a particular percentage of the observed latencies be less than the target latency. For example, assuming that, as is typically the case, the observed latencies are normally distributed with a particular mean and variance (rather than being uniformly distributed as in FIG. 3), the processor may set the target latency as the inverse of a cumulative normal distribution function for the particular mean and variance, evaluated at any suitable percentile equal to 100% or less. For example, the processor may require that 90% of the observed latencies be less than the target latency; this implies calculating the inverse of the appropriate cumulative normal distribution function at the $90^{th}$ percentile. Alternatively, the processor may set the target latency in any other suitable way, e.g., responsively to any relevant statistics (e.g., a maximum, mean, and/or variance) calculated for the observed latencies.

Further to setting the target latency, the system enters an active mode of operation, in which the system delays packets, as necessary, such as to achieve the target latency. It is noted that the system may be in passive mode with respect to one flow, while in active mode with respect to another flow. It is further noted that the system may, in some cases, immediately enter the active mode with respect to a particular flow. For example, assuming that flow A and flow B share similar properties (as described above), the system may apply, to flow B, a target latency that was calculated from data acquired from flow A, thus obviating the need to first passively monitor flow B. (Nonetheless, as described immediately below, the system may subsequently adjust the target latency for flow B, based on data for flow B, and/or other information, acquired while in active mode.)

In some embodiments, while in active mode, the system adaptively adjusts the target latency. For example, the system may adjust the target latency in response to new data that are gathered, and/or in response to reports of jitter (or "packet delay variation") received from any of the terminals using the network (e.g., the receiving terminal). For example, in VoLTE cellular networks, terminals may continually transmit Real-time Transport Control Protocol (RTCP) messages to the core network. These messages report to the core network, inter alia, the jitter that is experienced by the target terminals. The system may receive these messages en route to the core network, and, in response to the reported jitter, adjust the target latency. For example, the system may increase the target latency, if a relatively high amount of jitter is reported. As another example, in response to the reported jitter, the system may maintain the target latency, but change the delay duration. For example, the system may compare the jitter that is reported in implementing the embodiment of FIG. 2B with the jitter that is reported in implementing the embodiment of FIG. 2A. If the latter is less than the former, the system may choose the embodiment of FIG. 2A, i.e., choose the greater delay duration dT2 of FIG. 2A, and ignore the estimate of dT3 (which is assumed to be too high). The system may then re-estimate dT3, e.g., by refining the estimation technique that was previously used, or by using a different estimation technique.

In general, the delay of packets by the system does not delay the playback, as long as the target latency is less than the size (measured in units of playback time) of the jitter buffer of the target terminal. For example, a line 42 in FIG. 3, having the equation T2=T1+80 ms, delineates an "upper limit" of 80 ms for the target latency, assuming a jitter buffer size of 80 ms. If the target latency is set higher than this upper limit, playback will be delayed. Thus, in some embodiments, the dejittering system sets the target latency responsively to an estimated size of the jitter buffer of the target terminal. For example, the system may require that the target latency be no greater than the estimated size of the jitter buffer.

In some embodiments, a single estimated buffer size is used for all terminals. In other embodiments, different estimated buffer sizes are used for different types of terminals. Typically, in such embodiments, the system is provided with a list of buffer sizes corresponding to respective terminal types. Upon identifying the type of receiving terminal for a particular flow, the system looks up the buffer size that corresponds to the identified terminal-type, and uses this buffer size in setting the target latency. (To identify the type of receiving terminal, the processor may use any technique known in the art. For example, the processor may identify the type of receiving terminal from a User-Agent string or from an International Mobile Station Equipment Identity (IMEI) contained in the traffic.)

Despite the resulting playback delay, however, it may be advantageous to set the target latency to be greater than the buffer size, if such a target latency will allow more packets to be played. For example, with reference to the data in FIG. 3, packets having a latency greater than the buffer size of 80 ms, such as the packet corresponding to data point 44a, are not played. To ensure that such packets are played, while also dejittering the network, the system may set the target latency to be sufficiently greater than 80 ms such that at least some (e.g., 90%) of these very-delayed packets will fall below the target latency line. For example, a line 48 in FIG. 3 delineates a hypothetical target latency of 100 ms. Such a target latency will dejitter the network, while also allowing even the most-delayed packets to be played. The "price," on the other hand, assuming a buffer size of only 80 ms, is that playback will be delayed by approximately 20 ms.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for reducing jitter in a cellular communication network caused by a variable amount of time required for a packet, which is communicated over the cellular communication network by a source communication terminal to a target communication terminal, to pass through a core network of the cellular communication network, the method comprising:
  utilizing a dejittering system coupled between base stations of the cellular communication network and the core network of the cellular communication network to perform:
    at a first time, receiving the packet both (i) at a first time before the packet passes through the core network, and at a second time after the packet has passed through the core network;
    calculating a delay duration based on a difference between the second time and the first time;
    delaying the packet by the calculated delay duration; and
    subsequent to delaying the packet, releasing the packet, wherein calculating the delay duration comprises:
      subsequently to receiving the packet at the first time, recording the first time, in association with an identifier of the packet, in a memory;
      in response to receiving the packet at the second time, retrieving the first time from the memory, using the identifier of the packet;
      subsequently to retrieving the first time, calculating the difference between the second time and the first time; and
      calculating the delay duration by subtracting the calculated difference from a target latency.

2. The method according to claim 1, wherein:
  the cellular communication network includes a first base station, to which the source communication terminal transmits the packet, and a second base station, which transmits the packet to the target communication terminal,
  receiving the packet at the first time comprises receiving the packet at the first time while the packet is enroute from the first base station to the core network, and
  receiving the packet at the second time comprises receiving the packet at the second time while the packet is enroute from the core network to the second base station.

3. The method according to claim 1, wherein the packet belongs to a flow, and wherein the target latency is set for the flow.

4. The method according to claim 3, further comprising setting the target latency.

5. The method according to claim 4, wherein setting the target latency comprises setting the target latency by requiring that a particular percentage of observed latencies be less than the target latency.

6. The method according to claim 4, wherein setting the target latency comprises setting the target latency responsively to an estimated size of a jitter buffer of the target communication terminal.

7. The method according to claim 4, wherein the target latency is a first target latency, and wherein the method further comprises setting a second target latency for another flow that is different from the first target latency.

8. The method according to claim 4, wherein setting the target latency comprises setting the target latency in response to a similarity between the flow and another flow.

9. The method according to claim 1, wherein the amount of time is a first amount of time, the method further comprising:
  estimating a second amount of time required for the packet (i) to reach the dejittering system from the source communication terminal, and (ii) to reach the target communication terminal from the dejittering system; and
  calculating the delay duration comprises calculating the delay duration by subtracting the estimated second amount of time from the target latency.

10. The method according to claim 1, wherein delaying the packet comprises delaying the packet responsively to a message from the target communication terminal that reports a packet delay variation.

11. A method for reducing jitter in a cellular communication network caused by a variable amount of time required for a packet, which is communicated over the cellular communication network by a source communication terminal to a target communication terminal, to pass through a core network of the cellular communication network, the method comprising:

performing in a dejittering system coupled between base stations of the cellular communication network and the core network of the cellular communication network:

receiving a packet in the cellular communication network from a first cellular communication terminal;

providing, using the cellular communication network, the packet to a dejittering system;

receiving a delayed packet, wherein the delayed packet includes the packet which is delayed from the dejittering system by a period of delay; and providing the delayed packet to a second cellular communication terminal, wherein the dejittering system performs a packet delay determination comprising:

at a first time, receiving the packet both (i) at a first time before the packet passes through the core network, and at a second time after the packet has passed through the core network;

calculating a delay duration based on a difference between the second time and the first time;

delaying the packet by the calculated delay duration; and subsequent to delaying the packet, providing the delayed packet to the cellular communication network, wherein calculating the delay duration comprises:

subsequently to receiving the packet at the first time, recording the first time, in association with an identifier of the packet, in a memory;

in response to receiving the packet at the second time, retrieving the first time from the memory, using the identifier of the packet;

subsequently to retrieving the first time, calculating the difference between the second time and the first time; and calculating the delay duration by subtracting the calculated difference from a target latency.

12. The method according to claim 11, wherein:

the cellular communication network includes a first base station, to which the source communication terminal transmits the packet, and a second base station, which transmits the packet to the target communication terminal, receiving the packet at the first time comprises receiving the packet at the first time while the packet is enroute from the first base station to the core network, and receiving the packet at the second time comprises receiving the packet at the second time while the packet is enroute from the core network to the second base station.

13. The method according to claim 11, wherein the packet belongs to a flow, and wherein the target latency is set for the flow.

14. The method according to claim 13, further comprising setting the target latency.

15. The method according to claim 14, wherein setting the target latency comprises setting the target latency by requiring that a particular percentage of observed latencies be less than the target latency.

16. The method according to claim 14, wherein setting the target latency comprises setting the target latency responsively to an estimated size of a jitter buffer of the target communication terminal.

17. The method according to claim 14, wherein the target latency is a first target latency, and wherein the method further comprises set ting a second target latency for another flow that is different from the first target latency.

18. The method according to claim 14, wherein setting the target latency comprises setting the target latency in response to a similarity between the flow and another flow.

19. The method according to claim 11, wherein the amount of time is a first amount of time, the method further comprising:

estimating a second amount of time required for the packet (i) to reach the dejittering system from the source communication terminal, and (ii) to reach the target communication terminal from the dejittering system; and calculating the delay duration comprises calculating the delay duration by subtracting the estimated second amount of time from the target latency.

20. The method according to claim 11, wherein delaying the packet comprises delaying the packet responsively to a message from the target communication terminal that reports a packet delay variation.

* * * * *